US009901813B2

(12) United States Patent
Keating

(10) Patent No.: US 9,901,813 B2
(45) Date of Patent: Feb. 27, 2018

(54) SYSTEMS AND METHODS FOR ENHANCING TARGET ACQUISITION OF VIDEO GAMES

(71) Applicant: Kyle Lee Keating, Emeryville, CA (US)

(72) Inventor: Kyle Lee Keating, Emeryville, CA (US)

( * ) Notice: Subject to any disclaimer, the term of this patent is extended or adjusted under 35 U.S.C. 154(b) by 42 days.

(21) Appl. No.: 15/064,311

(22) Filed: Mar. 8, 2016

(65) Prior Publication Data

US 2016/0256778 A1 Sep. 8, 2016

Related U.S. Application Data

(60) Provisional application No. 62/129,916, filed on Mar. 8, 2015.

(51) Int. Cl.
*A63F 9/24* (2006.01)
*A63F 13/00* (2014.01)
*G06F 17/00* (2006.01)
*G06F 19/00* (2011.01)

(52) U.S. Cl.
CPC .................... *A63F 13/00* (2013.01)

(58) Field of Classification Search
CPC ...... A63F 2009/2457; A63F 2009/2461; A63F 2009/246; A63F 13/00
See application file for complete search history.

(56) References Cited

U.S. PATENT DOCUMENTS

| 4,285,523 | A  * | 8/1981  | Lemelson | A63F 13/02 348/836 |
| 9,079,099 | B1 * | 7/2015  | Murphy   | A63F 13/219 |
| 2012/0058823 | A1 * | 3/2012  | Minato   | A63F 13/525 463/32 |
| 2014/0309036 | A1 * | 10/2014 | Hossain  | A63F 13/428 463/36 |

* cited by examiner

*Primary Examiner* — Kevin Y Kim
(74) *Attorney, Agent, or Firm* — Kang Lim

(57) ABSTRACT

The present invention relates to systems and methods for providing gaiming points for video gamers. In one embodiment, a gaiming system is coupled to a monitor of a computerized video gaming system. The gaiming system includes an energy source and a display. A gaiming command from the computerized video gaming system instructs the energy source to project a substantially narrow energy beam. The display has a gaiming target configured to scatter a portion of the narrow energy beam thereby generating a visible gaiming point substantially centered with respect to the monitor. In some embodiments, the intensity of the energy beam is selectable. It is also possible to contour the display to minimize unwanted scattering of the energy beam.

19 Claims, 9 Drawing Sheets

SECTION A-A

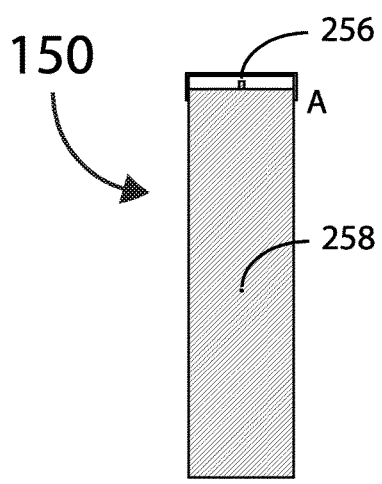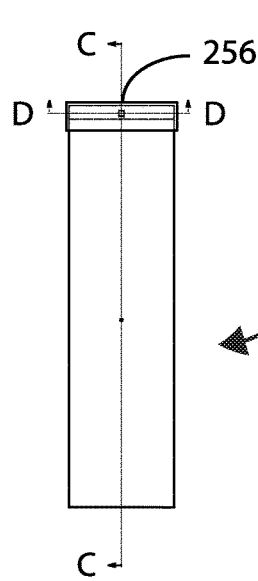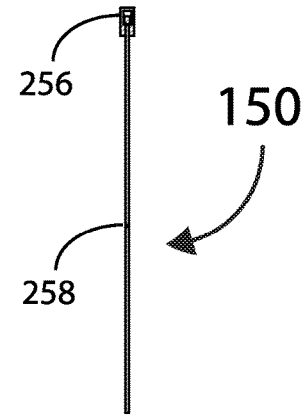
FIG. 2B
FIG. 2C
FIG. 2D
FIG. 2E
FIG. 2F

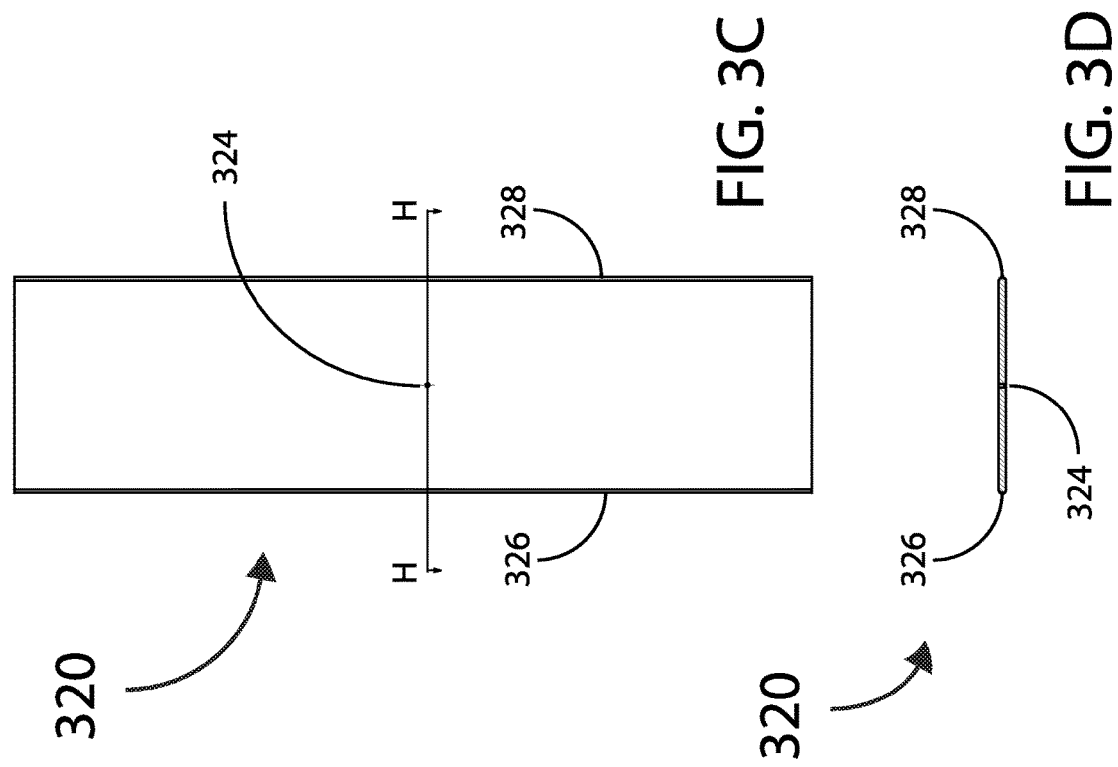

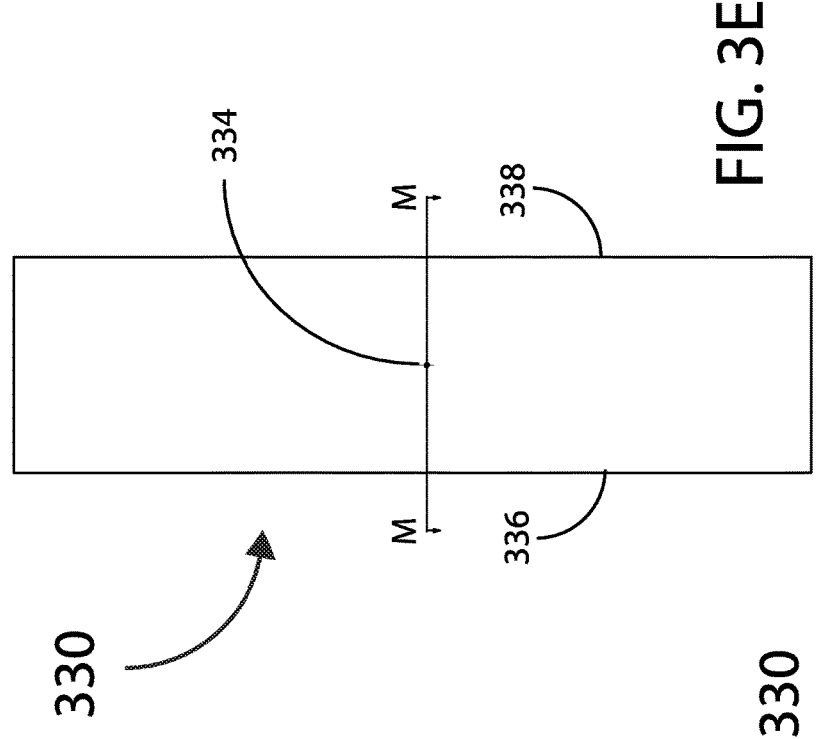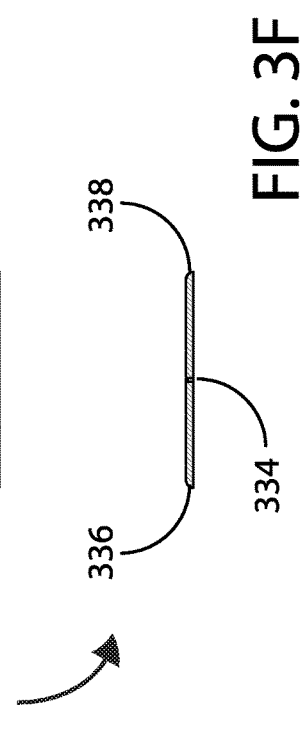

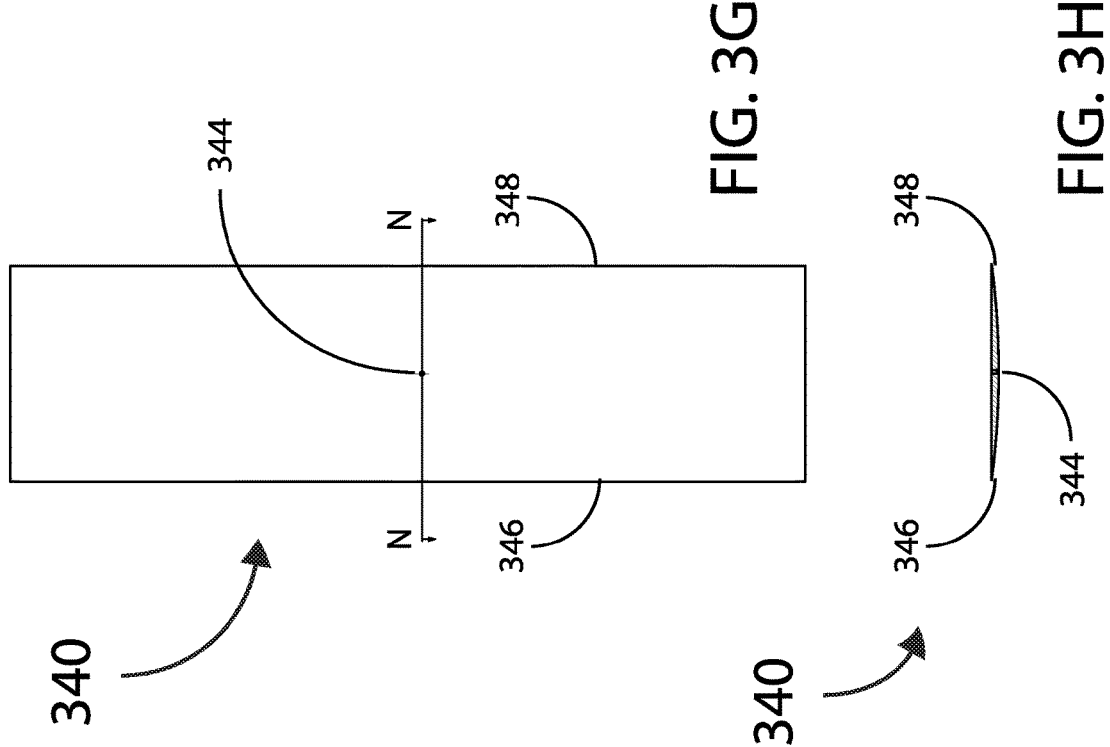

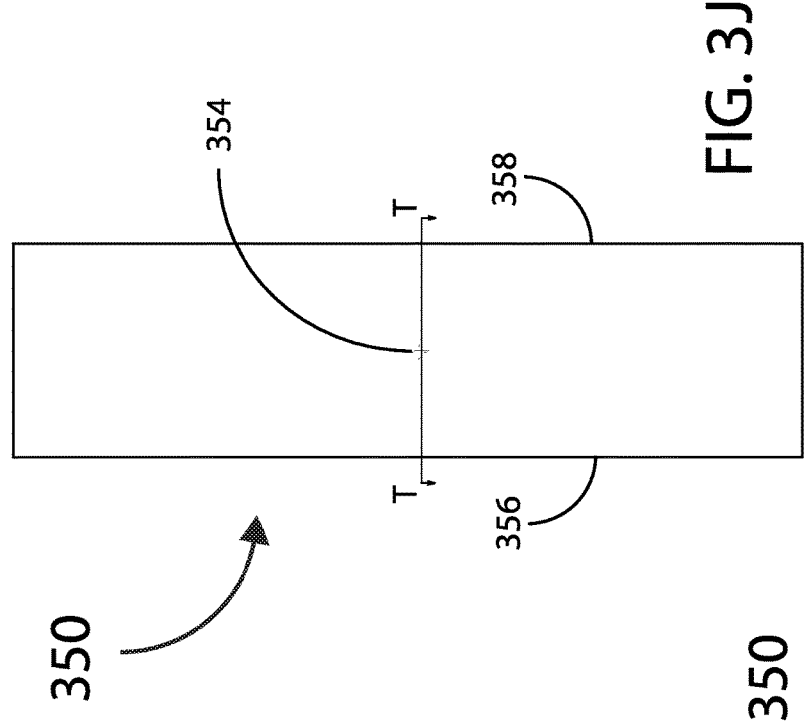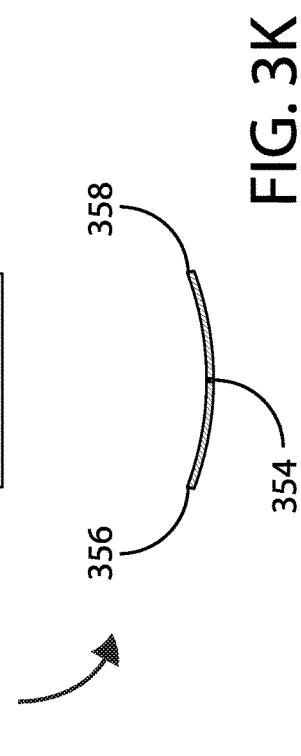

SYSTEMS AND METHODS FOR ENHANCING TARGET ACQUISITION OF VIDEO GAMES

CROSS REFERENCE TO RELATED APPLICATIONS

This non-provisional application claims the benefit of provisional application No. 62/129,916, filed Mar. 8, 2015, which application is incorporated herein in its entirety by this reference.

BACKGROUND

The present invention relates to systems and methods for improving target aiming accuracy and/or target acquisition speed of participants during interactive video games.

Interactive action video gaming systems have evolved and improved rapidly over the past twenty years. Many interactive video games on the Gen4 gaming systems, such as the Sony PlayStation4, are capable of providing players with an almost real-time interactivity. Many of these video games are action-based games involving the acquisition and shooting of target(s) while each player's avatar is on the move, and most of these video games present an aiming point proximate to a physical center of the gaming system's display screen.

In many of these video games, the aiming point disappears or changes shape when an avatar is on the move, and then reappears or reverts shape when the avatar is stationary. The absence or mutation of the aiming point during the avatar's movements substantially increases target acquisition and/or reacquisition time, and potentially also reduces the accuracy of the avatar. Further, crosshairs provided by the video games are often dim and hard to visualize.

Prior feeble attempts at providing a more permanent aiming point on the display device include attaching a sticker or attaching an LED using a suction cup at the center of the screen. Both of these methods are deficient. A sticker does not work well in "darker" scenes, such as inside dimly lighted rooms. Disadvantages of attaching an LED with a suction cup include obscuring the area covered by the cup and also the area covered by the power supply leads for the LED. The physical size of the LED is another disadvantage.

It is therefore apparent that an urgent need exists for improved aiming capability for players of video games. This improved aiming capability will enable video gamers to quickly and accurately accomplish target acquisition while on the move.

SUMMARY

To achieve the foregoing and in accordance with the present invention, systems and methods for generating aiming points for video gamers is provided.

In one embodiment, an aiming system, coupled to a monitor of a computerized video gaming system, includes an interface, an energy source and a display. The interface is configured to receive an aiming command from the computerized video gaming system. The energy source is configured to project a substantially narrow energy beam, while the display has an aiming target configured to scatter a portion of the narrow energy beam thereby generating a visible aiming point at the aiming target. In this embodiment, the aiming point is substantially centered with respect to the monitor.

In some embodiments, the intensity of the energy beam is selectable. It is also possible to contour the display, e.g., the edges and/or profile of the display, to minimize unwanted scattering of the energy beam. In some embodiments, aiming system 150 can be temporarily and/or permanently attached to video gaming system 110 using one or more of a variety of techniques known to one skilled in the art, including hook-and-loop, mechanical fasteners such as screws and rivets, magnets, clamps, straps, elastic bands and adhesives including double-sided tape.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which:

FIGS. 2B-2F are additional views illustrating the aiming system of FIG. 1A; and FIGS. 3A-3B, 3C-3D, 3E-3F, 3G-3H and 3J-3K are pairs of front views and horizontal sectional views illustrating several modifications that can be made to the aiming system of FIG. 1A.

DETAILED DESCRIPTION

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "first," "initially," "next," "subsequently," "before," "after,"

"lastly," and "finally," are not meant to limit the scope of the present invention as the embodiments disclosed herein are merely exemplary.

Figure 1A:
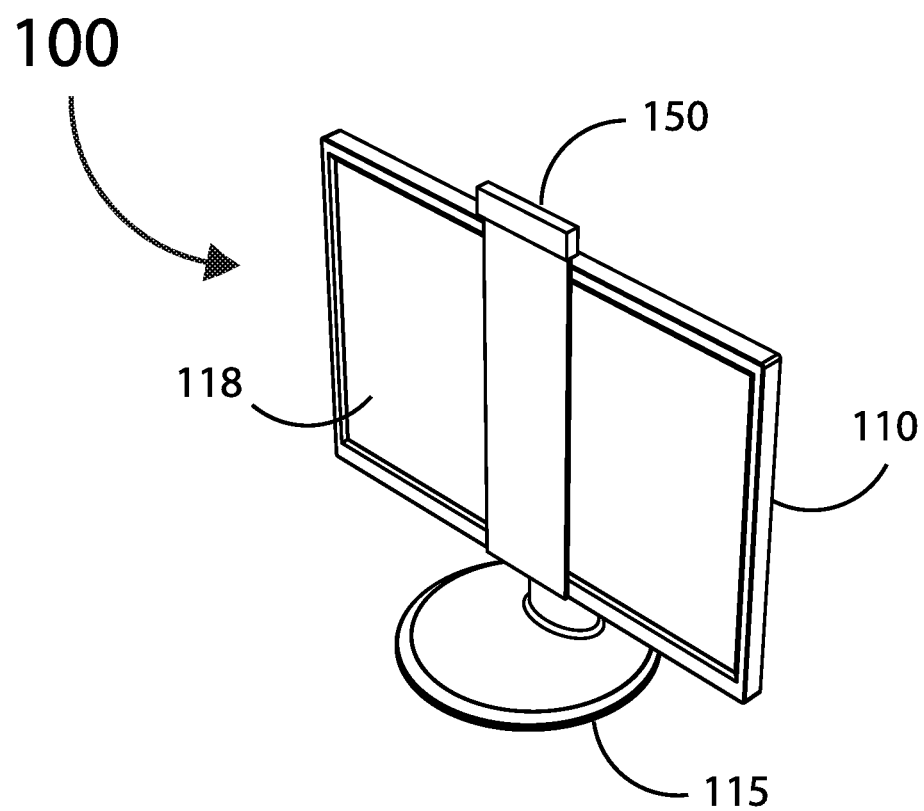
FIGS. 1A, 1B & 1C are a perspective view, a front view and a cross-sectional view "A-A", respectively, illustrating one embodiment of an aiming system coupled to a video gaming system, in accordance with the present invention.
Figure 1B:
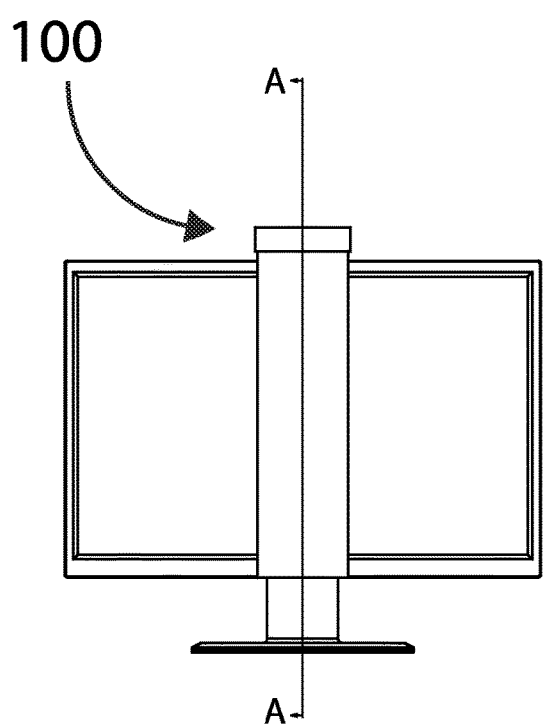
Figure 1C:
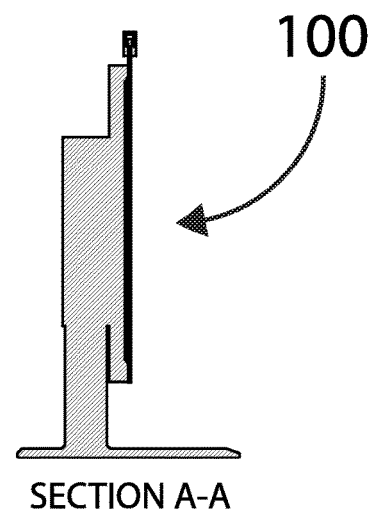

To facilitate discussion, FIGS. 1A, 1B & 1C are a perspective view, a front view and a cross-sectional view "A-A", respectively, illustrating one embodiment 100 incorporating an aiming system 150 coupled to a video gaming system 110 having a monitor 118 and a support base 115, in accordance with the present invention. Note that gaming system 110 can be any one of a wide variety of computerized devices, including laptops, tablets, desktops, game consoles and televisions, i.e., gaming system 110 may or may not include a separate display monitor.

Figure 2A:
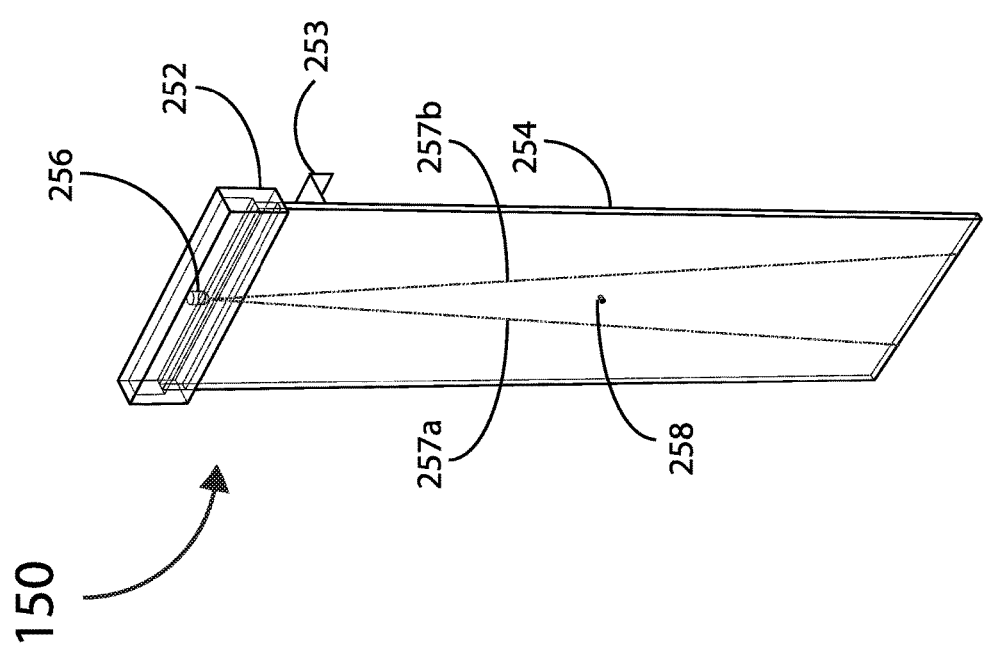
FIG. 2A is a perspective view of the aiming system of FIG. 1A.

In this embodiment, as shown in FIG. 2A, aiming system 150 includes an enclosure 252, a support bracket 253, an energy source 256, and a display 254 having an aiming point 258. During operation, energy source 256 provides a narrow beam of visible light, defined by boundaries 257a, 257b (beam angle exaggerated for illustration and hence not drawn to scale). The beam of light is "scattered", e.g., by a small hole drilled in display 254, thereby providing a distinctly visible aiming point 258 for the video gamer(s).

aiming point 258 can include one or more of aiming reticles known to one skilled in the art. For example, aiming point 258 can incorporate a dot, a cross hair and/or a circle.

FIGS. 2B-2D further illustrate the embodiment of aiming system 150. FIGS. 2B with 2C show a vertical lateral sectional view "B-B" of aiming system 150, while FIGS. 2D together with 2E & 2F illustrate two additional sectional views "C-C" and "D-D" of aiming system 150.

Alternate methods for illuminating aiming point 258 are possible. For example, in another embodiment, energy source 256 provides an invisible beam of electro-magnetic radiation capable of targeting and fluorescing aiming point 258. In yet another embodiment, an energy source located on the side of the video monitor provides a horizontal beam of energy to the aiming point. It may also be possible to energize a visible aiming point using electro-magnetic induction, for example, by using a micro-induction coil coupled to a miniature incandescent light bulb. In some embodiments, aiming point 258 may also include a bioluminescent material that can react with the energy source 256 to enhance the intensity of aiming point 258.

In order to accommodate a wide variety of video games, aiming system 150 may be configurable by the video-gaming system and/or the video gamer. In some embodiments, the intensity of the aiming point may be adjustable (statically or dynamically), the aiming point may flash, e.g., the aiming point intensity may be temporarily reduced when on video gamer's avatar is on the move or in scene with a darker background.

In some embodiments, energy source 256 is capable of producing a selectable spectrum of visible light, thereby significantly increasing the versatility of aiming system 150, and providing superior gaming point visibility for a wider variety of video gaming scenarios.

Further, to be able to better interact with the video game, the aiming system 150 may be able to communicate directly with the video game system 110 via for example an API. In addition, the aiming system 150 may also (passively) measure the light intensity of a portion of the monitor of the video gaming system 110, and adjusting the intensity of the aiming point accordingly.

Referring now to the FIGS. 3A-3B, 3C-3D, 3E-3F, 3G-3H and 3J-3K, respective pairs of front views and horizontal sectional views, several modifications, alone and in combination, can be made to the aiming system 150 of FIG. 2A to minimize edge refraction resulting from stray energy generated by energy source 256.

Figure 3A:
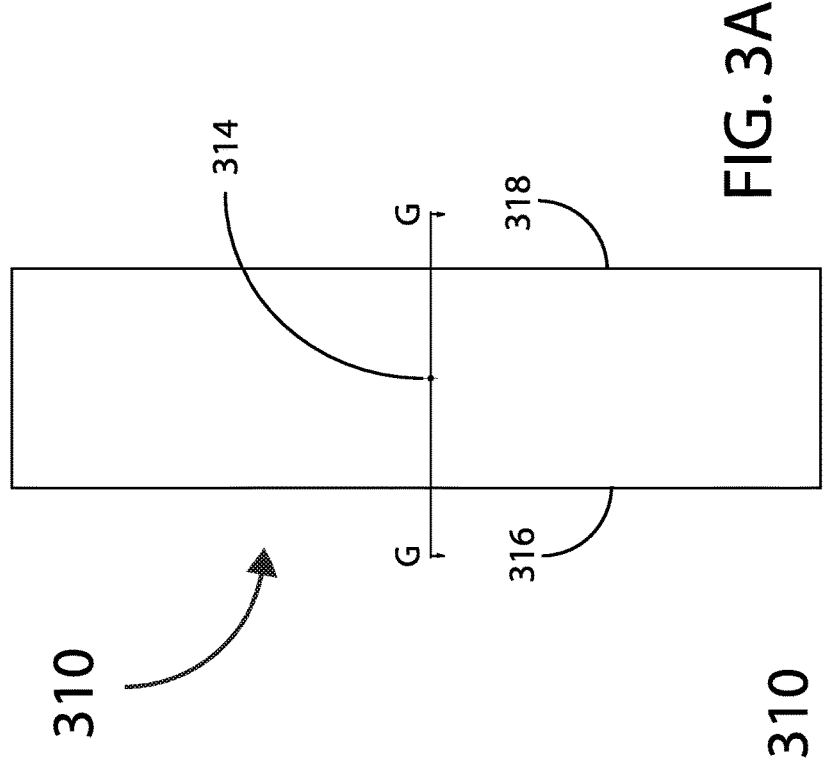
Figure 3B:
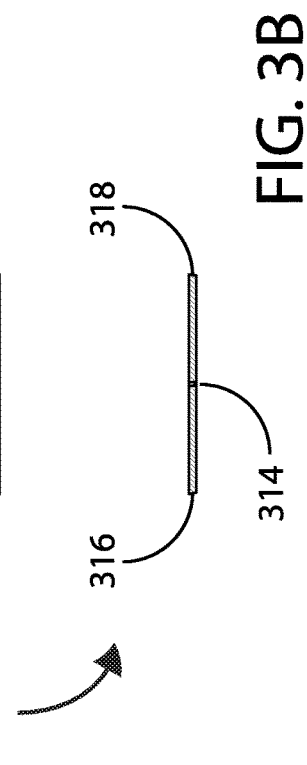

For example, FIGS. 3A and 3B, a sectional view G-G, illustrate an embodiment of aiming system display 310 with aiming point 314 and angled side edges 316 & 318. In addition, FIGS. 3C and 3D, sectional view H-H, illustrate another embodiment of aiming system display 320 with aiming point 324 and half-rounded side edges 326 & 328, while FIGS. 3E and 3F, a sectional view M-M, illustrate yet another embodiment of aiming system display 330 with aiming point 334 and quarter-rounded side edges 336 & 338.

FIG. 3G illustrates another embodiment of aiming system display 340 having an aiming point 344. In this embodiment, as shown by sectional view N-N of FIG. 3H, display 340 has a tapered cross-sectional profile thereby substantially reducing the thickness of the side edges 346 & 348. In yet another embodiment as shown in FIGS. 3J and 3K, display 350 includes a curved cross-sectional profile which may be contoured to match the surface of a curved video gaming system monitor (not shown).

Many modifications and additions are possible. For example, aiming system can be modified to support multiple players, by providing additional aiming points, which may be illuminated by the same power source or by additional power source(s). In some embodiments, aiming system 150 can be temporarily and/or permanently attached to video gaming system 110 using one or more of a variety of techniques known to one skilled in the art, including hook-and-loop, mechanical fasteners such as screws and rivets, magnets, clamps, straps, elastic bands and adhesives including double-sided tape.

In some embodiments, energy source of the above described embodiment of aiming systems can be self-powered by a battery and/or solar-cell. In some embodiments, light source is powered externally via USB, or via front. In yet other embodiments, light source is collected from the environment, e.g., the power indicator of the monitor, or concentrated from ambient lighting source(s), natural and/or artificial.

The advantages of exemplary aiming systems of the present invention include the ability of the video gamer to quickly acquire/reacquire potential targets while on the move and thereafter. Hence, the ability to generate a user-selectable and highly visible aiming point aids video gamers, especially gamers who may be color-blind. As a result, the aiming systems of the present invention provides superior user-friendly, fun and/or unique experiences for video gamers.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. In an aiming system, useful in association with a computerized video gaming system, a method of providing an aiming target, the method comprising:

receiving an aiming command from a computerized video gaming system to illuminate an aiming target of an aiming system; and projecting a narrow planar energy beam at the aiming target located on an overlay of the aiming system, wherein the overlay is aligned with and located in front of a monitor of the video gaming system; and scattering the planar energy beam at the aiming target in a direction toward a user of the video gaming system thereby improving target acquisition for the user by illuminating the aiming target.

2. The method of claim 1 further comprising:
receiving a command to vary a size of the aiming target; and
adjusting the size of the aiming target.

3. The method of claim 1 further comprising:
receiving a command to vary an intensity of the aiming target; and
increasing or decreasing the intensity of the aiming target.

4. The method of claim 1 further comprising:
detecting an intensity change of the monitor; and
increasing or decreasing the intensity of the aiming target in response to the intensity change of the monitor.

5. The method of claim 1 further comprising:
receiving a command to vary a viewing angle of the aiming target; and
adjusting the viewing angle of the aiming target by adjusting an intensity of the aiming target.

6. The method of claim 1 wherein the aiming target is at least one of an aiming dot, a cross-hair and a circle.

7. An aiming system, useful in association with a computerized video gaming system, the aiming system comprising:
an interface configured to receive an aiming command from a computerized video gaming system;
an overlay configured to be aligned with and located in front of a monitor of the video gaming system;
an energy source configured to project a substantially narrow planar energy beam along the overlay; and
an aiming target proximate overlay, the aiming target configured to scatter a portion of the narrow energy beam towards a user of the video gaming system thereby improving target acquisition for the user by illuminating the aiming target.

8. The aiming system of claim 7 wherein the interface is further configured to receive a command to vary at least one of aiming target size, intensity and viewing angle.

9. The aiming system of claim 7 further comprising:
a detector configured to detect an intensity change of the monitor; and
wherein the energy source is further configured to increase or decrease the intensity of the aiming target in response to the intensity change of the monitor.

10. The aiming system of claim 7 wherein the aiming target is at least one of an aiming dot, a cross-hair and a circle.

11. The aiming system of claim 7 wherein the aiming target include at least one of a hole and an aiming pattern.

12. The aiming system of claim 11 wherein the aiming target is machined or drilled.

13. The aiming system of claim 11 wherein the aiming target is etched.

14. The method of claim 1 wherein the aiming point is centered with respect to the monitor from a viewpoint of the user.

15. The aiming system of claim 11 wherein the aiming target is centered with respect to the monitor from a viewpoint of the user.

16. The aiming system of claim 7 wherein an edge of the overlay is contoured to minimize unwanted scattering of the energy beam.

17. The aiming system of claim 7 wherein a profile of the overlay is contoured to minimize unwanted scattering of the energy beam.

18. The aiming system of claim 7 wherein the aiming target is further configured to flash.

19. The aiming system of claim 7 wherein the intensity of the aiming target is further configured to vary in intensity depending on a movement or a background of a scene.

* * * * *